United States Patent [19]

Miller

[11] Patent Number: 4,609,465
[45] Date of Patent: Sep. 2, 1986

[54] FILTER CARTRIDGE WITH A CONNECTOR SEAL

[75] Inventor: John D. Miller, Homer, N.Y.

[73] Assignee: Pall Corporation, Glen Cove, N.Y.

[21] Appl. No.: 612,424

[22] Filed: May 21, 1984

[51] Int. Cl.$^4$ .............................................. B01D 27/08
[52] U.S. Cl. .............................. 210/323.2; 210/450;
210/484; 210/489; 210/493.1; 210/500;
210/500.1; 55/502
[58] Field of Search ...................... 210/323.2, 335, 450,
210/446, 447, 484, 485, 493.1, 493.2, 493.5,
500.2, 489, 321.1, 541; 55/497, 500, 521, 502

[56] References Cited

U.S. PATENT DOCUMENTS

| | | | |
|---|---|---|---|
| 2,092,749 | 9/1937 | Bradshaw | 210/204 |
| 2,573,639 | 10/1951 | Coler | 210/500.1 |
| 3,843,570 | 10/1974 | Murayama | 210/500.1 |
| 3,867,294 | 2/1975 | Pall et al. | 210/493.2 |
| 4,033,881 | 7/1977 | Pall | 210/493.2 |
| 4,130,622 | 12/1978 | Pawlak | 210/484 |
| 4,154,688 | 5/1979 | Pall | 210/493.1 |
| 4,248,924 | 2/1981 | Okita | 210/500.2 |
| 4,302,334 | 11/1981 | Jakabhazy et al. | 210/500.2 |
| 4,318,785 | 3/1982 | Gunjima et al. | 210/500.2 |
| 4,337,155 | 6/1982 | Sasaki et al. | 210/500.1 |
| 4,376,140 | 3/1983 | Kimoto et al. | 210/500.2 |
| 4,384,047 | 5/1983 | Benzinger et al. | 210/500.2 |
| 4,402,830 | 9/1983 | Pall | 210/493.2 |
| 4,414,280 | 11/1983 | Silva et al. | 210/500.2 |
| 4,464,263 | 8/1984 | Brownell | 210/484 |

OTHER PUBLICATIONS

Melt-Processible Fluoropolymer Composites, Crosby, Plastics Design Forum, Sep./Oct. 1983, pp. 77-81.
"Fluoroflow", H. R. Textron-Filter Products Division, 2823 Teller Rd., Newbury Park, CA 91320.

Primary Examiner—Richard V. Fisher
Assistant Examiner—Wanda L. Millard
Attorney, Agent, or Firm—Leydig, Voit & Mayer, Ltd.

[57] ABSTRACT

The disclosure describes a filter cartridge for removing particulates from a destructive fluid such as a hot acid or solvent. The filter cartridge comprises a cylindrical filter arrangement having a generally annular cross section and including a cylindrical, microporous fluoropolymeric filter for removing the particulate contaminants as the corrosive fluid flows through the filter. The filter arrangement also includes a cylindrical fluoropolymeric structure coaxially disposed adjacent the filter for supporting the filter. The filter cartridge further includes first and second impervious fluoropolymeric end caps concentrically disposed adjacent the first and second ends, respectively, of the filter arrangement. The first end cap includes a central aperture communicating with the center of the filter arrangement.

17 Claims, 3 Drawing Figures

U.S. Patent  Sep. 2, 1986  4,609,465
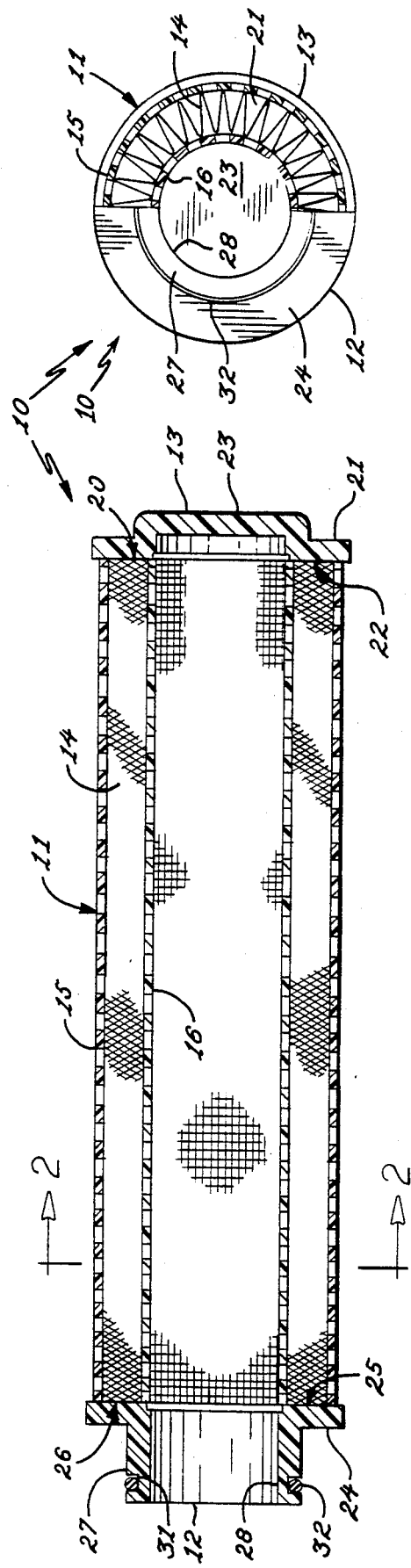
FIG. 2
FIG. 1
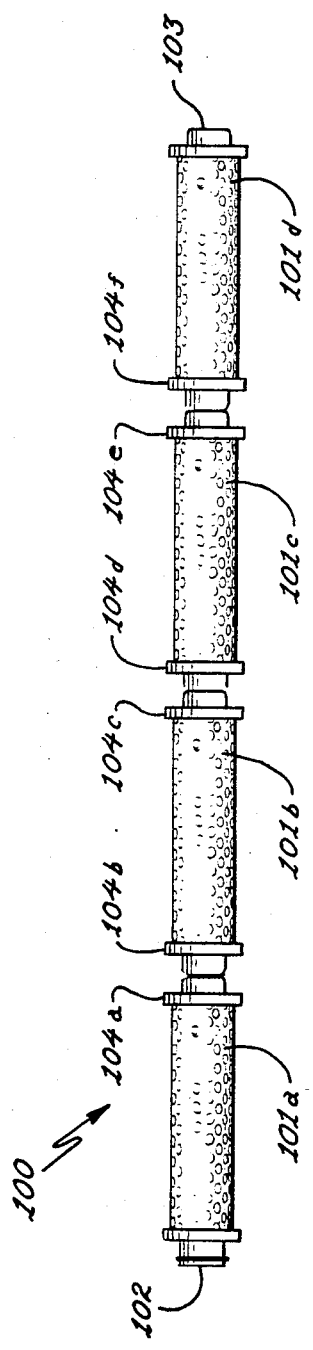
FIG. 3

FILTER CARTRIDGE WITH A CONNECTOR SEAL

TECHNICAL FIELD

The present invention relates to filters. In particular, it relates to filter cartridges for removing contaminants from destructive fluids.

BACKGROUND ART

A variety of industrial processes require the use of destructive fluids such as hot acids or solvents. For example, in the semiconductor fabrication industry, concentrated sulfuric acid heated to 212 degrees Fahrenheit (100 degrees Centigrade) is used for etching. In use, these destructive fluids usually become contaminated, e.g., with small undissolved particles, and either must be replaced or must be purified and reclaimed.

Since these destructive fluids may be expensive or may be used in large quantities and since it is difficult to safely dispose of these fluids, it is typically more desirable to purify and reclaim them than replace them. Various filtering apparatus for purifying contaminated destructive fluids have been previously suggested in the art. However, these filtering apparatus, which typically include a porous filter and support and flow-directing structure associated with the filter, frequently fail to withstand the deteriorative effects of the destructive fluids being purified. Either the porous filter or the associated structure, or both, are damaged or destroyed in the purification process. On the other hand, filtering apparatus immune to the deteriorative effects of these destructive fluids are frequently fabricated from exotic materials, such as certain exotic metals, and, therefore, are not only difficult to fabricate but also expensive.

DISCLOSURE OF THE INVENTION

The present invention provides an improved filtering apparatus for removing particulates from destructive fluids. In accordance with the invention, all components of the filtering apparatus are fabricated from a fluoropolymer, i.e., a plastic-like material which is highly resistant to the deteriorative effects of destructive fluids. As with many plastic-like materials, fluoropolymers are relatively easy to fashion. Consequently, the filtering apparatus of the present invention not only resists damage from the destructive fluids but is also relatively easily fabricated and inexpensive compared to the exotic alternatives. The present invention encompasses a filter cartridge for removing particulates from a destructive fluid. The filter cartridge includes a hollow, cylindrical filter arrangement through which the contaminated fluid flows. The filter arrangement includes a cylindrical, microporous fluoropolymeric filter for removing particulates from the fluid and an adjacent cylindrical fluoropolymeric structure for supporting the filter. The filter cartridge also includes an impervious fluoropolymeric end cap on each end of the filter arrangement to prevent contaminated fluid from bypassing the filter arrangement and to lend structural support to the filter arrangement. One of the end caps encloses one end of the filter arrangement. The other end cap has a cylindrical protrusion which projects away from the filter arrangement. The cylindrical protrusion contains a central hole which leads into the center of the filter arrangement and allows fluid to flow radially through the filter arrangement. The filter cartridge further includes a sealing ring cooperatively arranged with the end cap having the cylindrical protrusion and at least the external surface of the sealing ring comprises a fluoropolymeric material.

BRIEF DESCRIPTION OF DRAWINGS

In the accompanying drawings:

FIG. 1 is an axial sectional view of a filter cartridge of the present invention;

FIG. 2 is a partial cross sectional view of the filter cartridge of FIG. 1 as viewed along lines 2—2; and FIG. 3 is a side view of a filter assembly comprising a stack of filter cartridges, each similar to the filter cartridge of FIG. 1.

BEST MODE FOR CARRYING OUT THE INVENTION

As shown in FIGS. 1 and 2, an exemplary filter cartridge 10 embodying the present invention comprises a generally cylindrical filter arrangement 11 for filtering particulates from a destructive fluid and top and bottom end caps 12, 13 for directing the flow of contaminated fluid radially through the filter arrangement. In accordance with the invention, all the components of the filter cartridge 10, i.e., both the filter arrangement 11 and the top and bottom end caps 12, 13, are fabricated from fluoropolymers, i.e., any fluorine-containing polymer, including perfluoropolymers, which are highly resistant to the deteriorative effects of destructive fluids such as acids and/or solvents. Fluoropolymers are relatively easy to fashion compared to other materials, e.g., certain exotic metals, which are as resistant to such destructive fluids. Consequently, the filter cartridge of the present invention enables many applications which were physically and economically impractical for previous filter cartridges.

As described in more detail below, a preferred combination is polyvinylidene fluoride (PVDF) and polytetrafluoroethylene (PTFE). Combinations of these materials have good resistance to a variety of acids at ambient conditions, and in some cases higher temperatures, including hydrofluoric, nitric, hydrochloric, phosphoric, and sulfuric acid. Additionally, combinations of PTFE and PVDF are resistant to most polar solvents including ketones and esters, alcohols, chlorinated hydrocarbons, and most caustic solutions at a pH of less than 12.

The filter arrangement 11 of the illustrated embodiment comprises a cylindrically-shaped filter composite 14 which removes particulates from the destructive fluid and an outer perforated cage 15 and an inner perforated core 16 for supporting the filter composite 14 against forces acting on the composite 14 in a radially outward or radially inward direction, respectively. The outer perforated cage 15 also protects the filter composite 14 from rough handling and restrains the filter composite 14 if it swells. The cage 15 and the core 16 are preferably fabricated from PVDF when the filter cartridge 10 will be used for filtering hot sulfuric acid. In alternative embodiments, where extensive support of the filter composite 14 is not required, e.g., in filter cartridges having short filter composites, either the cage 15 or the core 16, or both, may be eliminated without departing from the scope of the invention.

The cylindrical filter composite 14 of the preferred embodiment comprises a layer of a woven PVDF monofilament mesh upstream and downstream from one or two layers of a microporous PTFE membrane, such as commercially available under the trademark EMFLON from Pall Corporation which serves as the filter medium. Preferably, the PTFE membrane has an absolute pore rating ranging from 0.1 to 1.0 micrometer and, therefore, filters submicronic particulates. The upstream and downstream PVDF mesh provide support and drainage for the PTFE membrane. Alternatively, the upstream and downstream support layers may comprise a nonwoven fluoropolymer or a fluoropolymer, such as PVDF, which has been embossed and stretched in a fashion similar to a material available under the trademark DELNET from Hercules Incorporated. Further, while the filter composite 14 of the preferred embodiment is longitudinally pleated, it may alternatively be used in a non-pleated configuration.

The top and bottom end caps 12, 13 serve to support the filter arrangement 11 and to prevent the destructive fluid from bypassing the filter arrangement 11. In the preferred embodiment, both the top and bottom end caps 12, 13 are fabricated from PVDF. The bottom end cap 13, which is impervious and completely encloses the bottom end 20 of the filter arrangement 11, includes an annular portion 21 with a planar end 22 facing the bottom end 20 of the filter arrangement 11 and a flattened dome-like protrusion 23 projecting away from the filter arrangement 11. The top end cap 12 also includes an annular portion 24 with a planar end 25 facing the top end 26 of the filter arrangement 11 and is also impervious. Unlike the bottom end cap 13, however, the top end cap 12 includes a cylindrical protrusion 27 with a central aperture 28 which allows the destructive fluid to enter or exit the central portion 30 of the filter arrangement 11. The cylindrical protrusion 27 also has an external circumferential groove 31 housing an O-ring 32 fabricated from, e.g., a PTFE sheathed elastomer, such as a silicone or an elastomeric fluoropolymer. The cylindrical protrusion 27 and the O-ring 32 allow the filter cartridge 10 to be attached to a mating connection of a reclamation system (not shown) for the destructive fluid. Alternatively, the top end cap 12 may include any other suitable mechanism for attaching the filter cartridge 10 to the connection, including threads and a flat ring seal along the cylindrical protrusion 27.

The filter cartridge 10 may be assembled according to several known techniques. For example, the downstream PVDF mesh, the PTFE membrane, and the upstream PVDF mesh may be composited to form the filter composite 14. The filter composite 14 may then be pleated and arranged in a cylindrical configuration with the pleats running axially, and the axially aligned ends of the pleated filter composite 14 may then be joined by heating and compressing the end pleats. The pleated filter composite 14 then may be inserted between the perforated cage 15 and core 16, yielding the filter arrangement 11, and the top and bottom ends 26, 20 of the filter arrangement 11 may be heat-melt sealed to the planar, annular ends 25, 22 of the top and bottom end caps 12, 13, respectively. Heat-melt sealing, as disclosed in Pall et al, U.S. Pat. No. 3,457,339, is a preferred method of sealing.

In the preferred mode of operation, the filter cartridge 10 is attached to the reclamation system by inserting the cylindrical protrusion 27 into the mating connection on the reclamation system. The destructive fluid contaminated, for example, with particulates of different sizes is then passed radially inwardly through the cylindrical filter arrangement 11 where the particulates are removed, and the purified fluid is then passed axially from the filter cartridge 10 through the mating connection. In particular, the contaminated fluid is passed through the perforated cage 15 and into the filter composite 14 where the the PTFE membrane removes all particulates as fine as, e.g., 0.1 micrometer. The purified fluid then passes through the perforated core 16 and into the central portion 30 of the filter cartridge 10. From the central portion 30, the purified fluid passes through the central aperture 28 in the cylindrical protrusion 27 and into the mating connection of the reclamation system.

A modified filter assembly also embodying the present invention can purify an even greater volume of contaminated destructive fluid in a given amount of time. As shown in FIG. 3, the filter assembly 100 comprises a stack of filter arrangements 101a-d, each identical to the filter arrangement 11 of the filter cartridge 10 of the original embodiment. The filter assembly 100 also comprises a top end cap 102 of the topmost filter arrangement 101a and a bottom end cap 103 on the bottom most filter arrangement 101d which are identical to the top end cap 12 and the bottom end cap 13, respectively, of the filter cartridge 10 of the original embodiment.

The end of each filter arrangement adjacent another filter arrangement is heat-melt sealed to a modified end cap 104a-f. Each modified end cap 104a-f is essentially a bottom end cap 103 with a central aperture in the flattened dome-like protrusion. Adjacent modified end caps are welded together with the central apertures in the adjacent end caps aligned.

In the preferred mode of operation, the filter assembly 100 operates analogously to the filter cartridge 10 of the original embodiment. The cylindrical protrusion on the top end cap 12 is inserted into the mating connection of the reclamation system. The fluid is then passed radially inwardly in parallel through the filter arrangements 101a-d where the particulates are removed. The purified fluid is then passed axially through the central portions of the filter arrangements 101a-d and the central openings in the modified end caps 104a-f, through the cylindrical protrusion in the top end cap 103, and into the mating connection.

Various fluoropolymers may be used in the manufacture of the filter cartridges of this invention. The preferred combination for use with hot sulfuric acid is a fine pored PTFE membrane, e.g., 0.1 to 1.0 micrometer absolute pore rating (available from Pall Corporation under the trademark EMFLON), with PVDF support and drainage layers on both sides of the PTFE membrane to form the filter composite 14 and with PVDF support and flow-directing structures associated with the filter composite 14.

Other fluoropolymers which may be used include Teflon PFA fluorocarbon polymers available from E. I. DuPont de Nemours and Company. These fluoropolymers are copolymers combining a carbon-fluorine backbone in the main chain with perfluoroalkoxy (PFA) side chains. These materials are inert to strong mineral, oxidizing and inorganic acids. They are also chemically resistant to organic acids, aromatic and aliphatic hydrocarbons, alcohols, aldehydes, ketones, ethers, amines, esters, chlorinated compounds, and classic polymer solvents. Other useful fluoropolymers include the copolymers of ethylene and chlorotrifluoroethylene available from Allied Corporation under the trademark HALAR. These HALAR fluoropolymers are resistant to strong mineral and oxidizing acids as well as essentially all organic solvents other than hot amines. Also useful in this invention are copolymers of ethylene and tetrafluoroethylene under the trademark TEFZEL from DuPont. These materials are inert to strong mineral acids and are little effected by aromatic and aliphatic hydrocarbons, alcohols, aldehydes, ketones, ethers, esters, chlorocarbons, and classis polymer solvents. In the September/October 1983 issue of *Plastic Design Forum,* an article entitled "Melt-Processible Fluoropolymer Composites" describes fluoropolymers useful in this invention.

Depending on the particular material being filtered, filter media other than those previously suggested may be used, including nonwoven fibrous fluoropolymers, felted fluoropolymers, woven fluoropolymers, and finer pore fluoropolymeric membranes. For example, a fibrous PTFE material is available from Norton under the trademark ZITEX and a very finely pored PTFE membrane is available from W. L. Gore and Associates under the trademark GORETEX. By appropriate selection of the particular filter medium for use in filter cartridges in accordance with this invention, filtering capabilities ranging from about 0.01 up to about 200 micrometers may be obtained.

Although the present invention has been described in terms of two particular embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

I claim:

1. A filter cartridge for removing particulates from a destructive fluid, said filter cartridge comprising a cylindrical filter arrangement having a generally annular cross section and including a cylindrical microporous fluoropolymeric filter for removing particulate contaminants from fluid flowing through the filter and further including a cylindrical fluoropolymeric structure coaxially disposed adjacent the filter for supporting the filter, first and second impervious fluoropolymeric end caps concentrically disposed adjacent first and second ends, respectively, of the filter arrangement, said first end cap including a cylindrical protrusion projecting away from the filter arrangement and containing means defining a central aperture communicating with the center of the filter arrangement and said second end cap enclosing said second end of said filter arrangement, and a sealing ring cooperatively arranged with the first end cap, at least the external surface of said sealing ring comprising a fluoropolymeric material.

2. The filter cartridge of claim 1 wherein the filter comprises a composite including at least one layer of a microporous filtering means disposed between an upstream and a downstream mesh, the filtering means being fabricated from a PTFE polymer and the upstream and downstream mesh being fabricated from a PVDF polymer.

3. The filter cartridge of claim 2 wherein the filtering means comprises a microporous membrane.

4. The filter cartridge of claim 2 wherein the composite is pleated.

5. The filter cartridge of claim 2 wherein said filtering means has an absolute pore rating of at least about 0.01 micrometer.

6. The filter cartridge of claim 1 wherein the cylindrical support structure comprises a perforated cylinder fabricated from a PVDF polymer and disposed downstream from the filter for supporting the filter.

7. The filter cartridge of claim 6 further comprising a perforated cylinder fabricated from a PVDF polymer and disposed upstream from the filter.

8. The filter cartridge of claim 7 wherein said filter cartridge is formed by fashioning a filter composite by compositing a downstream PVDF mesh, a PTFE membrane and upstream PVDF mesh, forming pleats in said filter composite, arranging said filter composite in a cylindrical configuration with said pleats running axially, joining the axially aligned ends of the pleated filter composite by heating and compressing said ends of the pleated filter composite; forming the filter arrangement by inserting said filter composite between said downstream perforated cylinder and said upstream perforated cylinder; and heatmelt sealing first and second ends of said filter arrangement to the ends of said first and second end caps, respectively.

9. The filter cartridge of claim 1 wherein the first and second end caps comprise a PFA fluorocarbon polymer.

10. The filter cartridge of claim 9 wherein the filter comprises a composite including at least one layer of a microporous filtering means disposed between upstream and downstream layers of PTFE fibers.

11. The filter cartridge of claim 10 wherein the cylindrical support structure comprises a PFA fluorocarbon polymer.

12. The filter cartridge of claim 1 wherein the first and second end caps are fabricated from a PVDF polymer.

13. The filter cartridge of claim 1 wherein said sealing ring comprises an elastomeric O-ring sheathed in a PTFE material, said O-ring mounted within an external circumferential groove formed in said cylindrical protrusion.

14. A filter assembly for removing particulates from a destructive fluid, said filter comprising a series of coaxially aligned, cylindrical filter arrangements including an initial filter arrangement having a first end facing away from the series of filter arrangements and a final filter arrangement having a second end facing away from the series of filter arrangements, each filter arrangement in the series having a generally annular cross section and including a cylindrical, microporous fluoropolymeric filter for removing particulate contaminants from fluid flowing through the filter and further including a cylindrical fluoropolymeric structure coaxially disposed adjacent the filter for supporting the filter; a first impervious fluoropolymeric end cap concentrically mounted to the first end of the initial filter arrangement and including a cylindrical protrusion facing away from the initial filter arrangement and containing means defining a central aperture communicating with the center of the initial filter arrangement; a second impervious end cap concentrically mounted to and enclosing the second end of the final filter arrangement; means disposed between adjacent filter arrangements for coaxially connecting the filter arrangements, and a sealing ring cooperatively arranged with the first end cap, at least the external surface of said sealing ring comprising a fluoropolymeric material.

15. A filter cartridge for removing particulates from a destructive fluid, said filter cartridge comprising a cylindrically-shaped filter arrangement including a composite means for filtering particulates from the destructive fluid while resisting the deteriorative effects of the destructive fluid, said composite means comprising a microporous PTFE membrane having an absolute pore rating of at least about 0.01 micrometer and upstream and downstream layers fashioned from nonwoven PTFE fibers for supporting the membrane and further including a perforated PTFE core disposed coaxially within the composite means and a perforated PTFE cage disposed coaxially about the composite means for supporting the composite means; a first impervious PTFE end cap joined to one end of the cylindrically-shaped filter arrangement and including a cylindrical protrusion facing away from the filter arrangement and containing means defining a central aperture communicating with the center of the filter arrangement; a second impervious PTFE end cap joined to and enclosing the other end of the cylindrically-shaped filter arrangement; and a sealing ring operatively associated with the first end cap, at least the external surface of the sealing ring comprising a fluoropolymeric material.

16. The filter cartridge of claim 15 wherein said sealing ring comprises an elastomeric O-ring sheathed in a PTFE material, said O-ring mounted within an external cylindrical groove formed in the cylindrical protrusion.

17. The filter cartridge of claim 15 wherein the filter arrangement is heat melt sealed to the first and second end caps.

* * * * *